Dec. 23, 1958  R. J. WILSON  2,865,647
CHAMBERMAID'S CART
Filed May 9, 1957
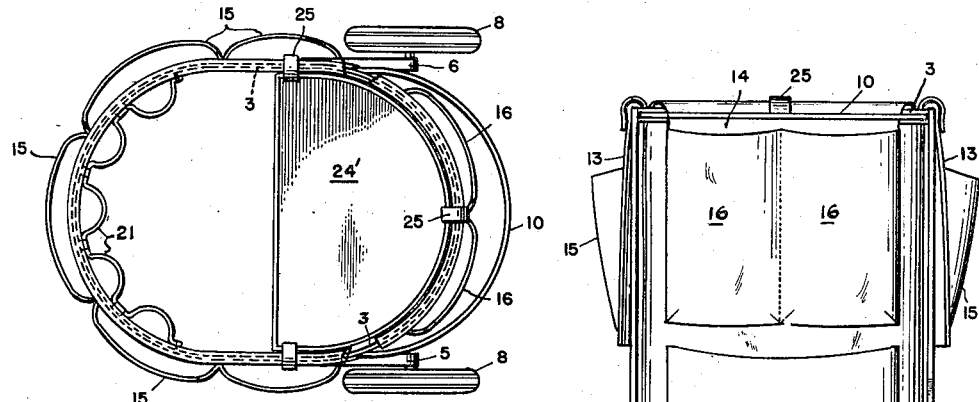
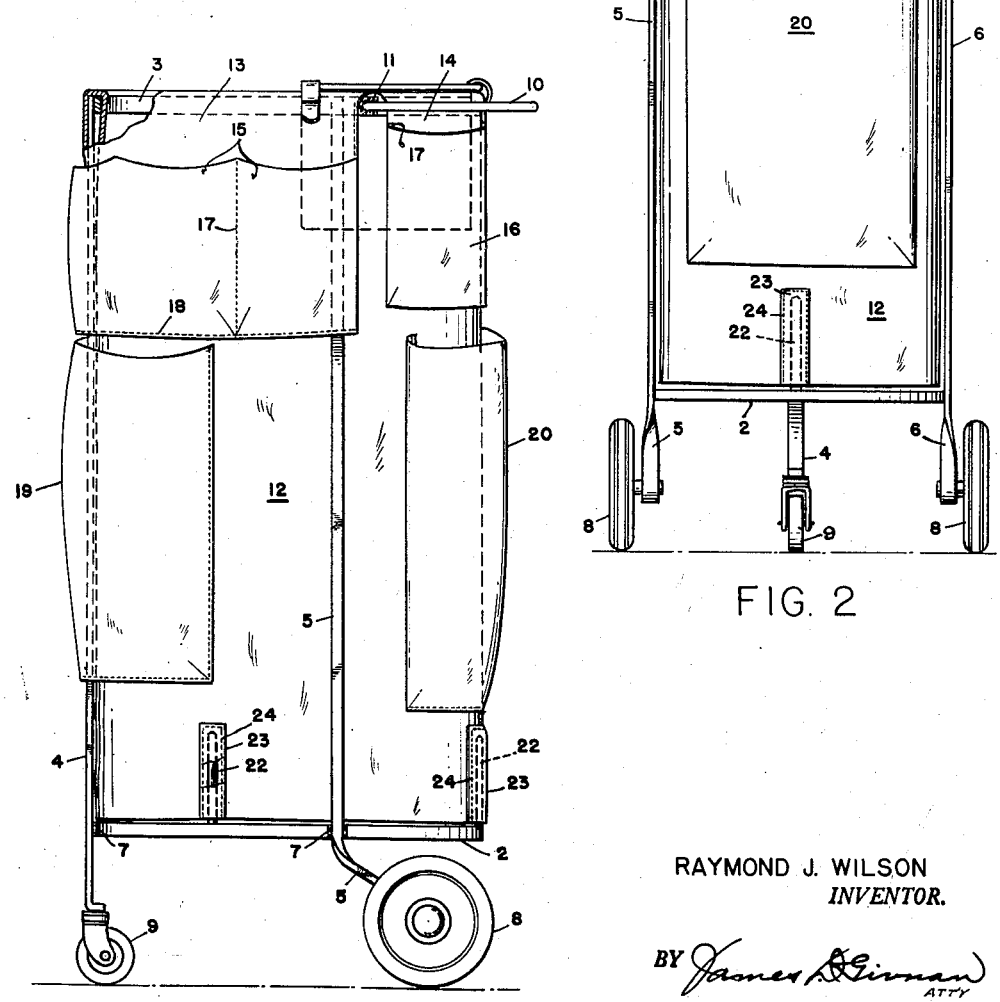
RAYMOND J. WILSON
INVENTOR.

United States Patent Office 2,865,647
Patented Dec. 23, 1958

2,865,647

CHAMBERMAID'S CART

Raymond J. Wilson, Portland, Oreg.

Application May 9, 1957, Serial No. 658,194

2 Claims. (Cl. 280—47.35)

This invention relates to new and useful improvements in utility conveyances and more particularly to a cart adapted to store and transport various items and implements used by housewives, chambermaids, janitors, and others in cleaning and janitorial operations.

It is one of the principal objects of the invention to provide a cart of this character which is of lightweight, durable construction, easily maneuverable, and including a vertically disposed main receptacle of flexible material provided with internal and external pockets and which is self-suspending within the cart and thereby quickly and conveniently removable for emptying its contents and with equal facility replaceable within the cart.

A further object of the invention is the provision of a cart to be normally maintained in a vertical position, tiltable rearwardly relative to its supporting wheels into a running position and the provision of means for holding the self-suspended main receptacle from swinging outwardly relative to the cart when so tilted.

The foregoing and other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a side view of a utility conveyance made in accordance with my invention.

Figure 2 is a rear view of Figure 1.

Figure 3 is a top view of Figure 1.

With continuing reference to the drawing, the invention comprises a chassis including a bottom ring member 2 and a matching top ring member 3 both interconnected in vertical spaced relation to each other by means of a forward vertical frame member 4 and rearward vertical frame members 5 and 6 to which the rings are secured by welding as at 7 or by bolts or rivets if desired.

The rearward frame members 5 and 6 extend downwardly and rearwardly from the bottom ring member 2 and are provided with supporting wheels 8. The forward frame member 4 extends vertically downward from the bottom ring member and is provided with a supporting caster wheel 9. If desired the caster wheel may be dispensed with and the frame member 4 further extended into a foot portion for contact with a floor or other supporting surface.

A handle bar 10 is secured by welding or the like as at 11 to the top ring member 3 and extends rearwardly therefrom for convenience in tipping the cart and guiding it on its rearward supporting wheels 8 or in maneuvering the cart in a vertical position on all three of its supporting wheels.

A main receptacle 12 of bag form for the reception of waste materials and preferably made of durable flexible material such as canvas or the like is self-suspended from the top ring member 3 by overhanging forward and rearward flexible apron portions 13 and 14, respectively, which are continuations of the walls of the bag. By this arrangement the bag may be quickly and conveniently lifted from the chassis for emptying its contents and with equal facility returned to its automatically suspended position. The forward apron 13 is provided with vertical pockets 15 and the rear apron 14 with similar pockets 16 all for the purpose of holding various canned and bottled cleaning fluids, soap, polishes, wax, cleaning rags or other articles, tools and implements used in janitorial operations. The pockets are secured to the exterior of their respective aprons and closed across their bottom ends as by stitching indicated respectively at 17 and 18. The front and rear walls of the bag 12 are similarly provided with enlarged pockets 19 and 20, respectively, disposed below the aprons 13 and 14.

The inside wall of the forward portion of the bag 12 is also provided with relatively small but elongated vertical pockets 21 extending to any desired depth relative to the bag for the purpose of supporting in a vertical manner the handles of brooms, brushes, mops, dusters, squeegees, and similar tools having elongated handles, not shown.

For stabilizing the lower portion of the bag 12, whether loaded or not, from swinging outwardly rearward of the chassis when the latter is tilted rearwardly into a running position, I provide the bottom ring 2 with three pins 22 secured by welding or the like to the top rim of the ring and extending upwardly therefrom for insertion into downwardly opening pockets 23 secured as by stitching 24 to the walls of the bag 12.

For carrying a supply of water when desired or for storing wet rags, sponges, and the like I provide a watertight receptacle 24' having spring clips 25 spaced about its top rim and thereby adapted for removable attachment to the top ring 3 and adjacent portions of the bag.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

1. A cart of the class described comprising a vertically disposed chassis mounted upon supporting wheels and adapted to be tilted rearwardly relative to the wheels into a running position, said chassis comprising a forward vertical frame member and two rearward vertical frame members, a top ring member secured to the top end of said frame members and a matching bottom ring member secured to the frame members near the bottom end thereof, said frame members extending below the bottom ring, the bottom end of the rearward frame members being turned rearwardly relative to the bottom ring and provided with said supporting wheels whereby the cart may be tilted rearwardly, an elongated bag vertically suspended within the chassis and extended at its top end into apron portions overhanging said top ring member in parallelism with the external walls of the bag, vertically disposed pockets secured to the internal and external walls of the bag, vertical pockets secured to the exterior of said apron portions whereby the weight of said apron portions cooperates with that of the bag in maintaining the bag suspended from said top ring member, a downwardly opening pocket secured to said bag at its bottom end between said rearward frame members, downwardly opening pockets secured to the bag at its bottom end between said forward and rearward vertical frame members, and correspondingly located vertically disposed pins secured to said bottom ring member and normally engaged within said downwardly opening pockets to thereby hold the bag against swinging outwardly rearward of the chassis when the cart is tilted rearwardly into a running position.

2. A cart as claimed in claim 1 including a vertically walled watertight receptacle semicircular in plan view and having a top rim, outwardly and downwardly extending spring clips secured to said rim of the receptacle and normally in sprung engagement with the overhanging apron portions adjacent said top ring member whereby to secure the top end of said bag against disarrangement relative to the top ring member due to unequal loads carried by the external pockets of the bag and those of said apron portions.

References Cited in the file of this patent

UNITED STATES PATENTS

| | | |
|---|---|---|
| 792,197 | Clark | June 13, 1905 |
| 1,635,423 | Lapham | July 12, 1927 |
| 1,638,203 | Jetel | Aug. 9, 1927 |
| 1,662,089 | Viverito | Mar. 13, 1928 |
| 2,311,422 | Walling | Feb. 16, 1943 |
| 2,597,544 | Swain | May 20, 1952 |
| 2,636,207 | Reece | Apr. 28, 1953 |
| 2,778,654 | Gottlieb | Jan. 22, 1957 |